(No Model.)
R. WRIGHT.
FISH HOOK.
No. 319,655. Patented June 9, 1885.
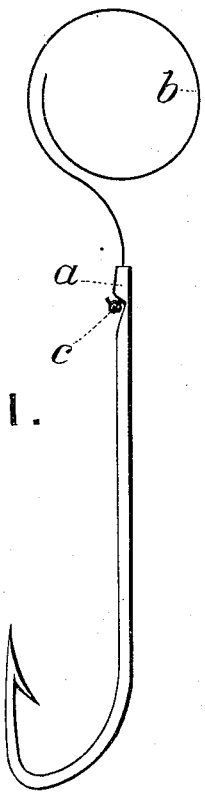
FIG. 1.
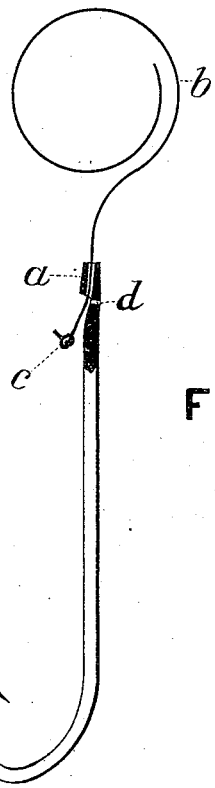
FIG. 2.
FIG. 3.
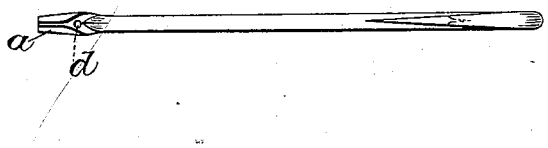
WITNESSES
INVENTOR

United States Patent Office.

ROBERT WRIGHT, OF REDDITCH, COUNTY OF WORCESTER, ENGLAND.

FISH-HOOK.

SPECIFICATION forming part of Letters Patent No. 319,655, dated June 9, 1885.

Application filed May 19, 1884. (No model.) Patented in England March 8, 1884, No. 4,581.

*To all whom it may concern:*

Be it known that I, ROBERT WRIGHT, of Redditch, in the county of Worcester, England, a subject of the Queen of Great Britain, have invented a new and useful Improvement in Fish-Hooks, (for which I have applied for Letters Patent in Great Britain, No. 4,581, and bearing date March 8, 1884;) and I do hereby declare that the following specification and accompanying drawings are a full and clear description of the invention, and will enable others skilled in the art to which it appertains to make and use the same.

Figure 1 is a side elevation of one of my improved fish-hooks and a short piece of line. Fig. 2 is a part elevation and part section of the same hook and piece of line. Fig. 3 is a front elevation of the hook, showing a modified form of the recess for the knot.

Now, my improvement consists in the formation at the end of the shank of the hook of a socket or passage, $a$, through which the line $b$ passes and finishes with a knot, $c$, which secures the line in its position, said shank being also provided with a transverse hole, $d$, just below said socket or passage. The socket or tube $a$ may be of any convenient length, and may be formed either by thinning the metal down and curling it round into a spiral socket and natural recess for the knot $c$ or by drilling a hole in the shank and shaping a recess for the knot $c$ out of the solid metal, or by flattening the end of the hook and bending it round so as to form a socket, as shown in Fig. 3. The little hole $d$ is used for convenience in fastening the end of the line. This hole $d$ allows a piece of cord, thread, or wire to be passed through the shank of the hook from behind and tied around the fish-line and said shank just above the knot $c$, to complete the fastening.

These hooks may be made of any desired size and design to suit the various purposes to which such hooks are applied.

I am aware that it is not new to provide a fish-hook with an eye and secure the fish-line thereto by passing the lower end of said line through said eye and knotting it on the other side thereof. I am also aware that it is not new to provide a float or bob with shanks having tubular ends through which the fish-line passes. I do not claim either of these devices.

I am aware that garters have been made with short tubes, through which the ends of suspending-strings are passed and knotted. This, however, I do not claim.

What I do claim, and desire to secure by Letters Patent, is—

A fish-hook having a longitudinal passage, $a$, formed in the upper end of its shank, and a transverse hole, $d$, extending through said shank at the lower end of said passage, substantially as shown.

In testimony that I claim the foregoing as my own I affix my hand in the presence of two witnesses.

ROBERT WRIGHT.

Witnesses:
 MARY ELIZABETH PARSONS,
 GEORGE PRICE,
*Clerk to Mr. George Barker, 77 Colmore Row, Birmingham, England.*